Figure 3:
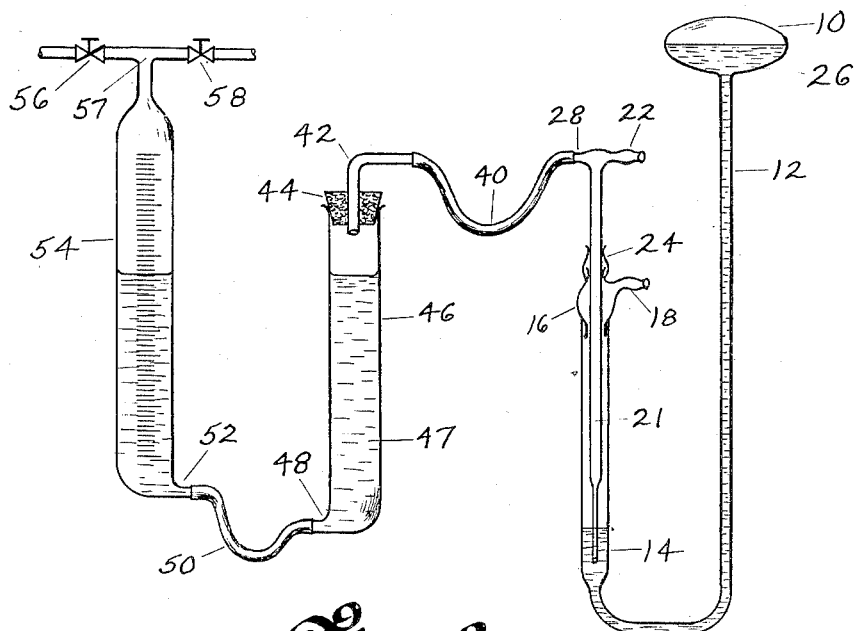

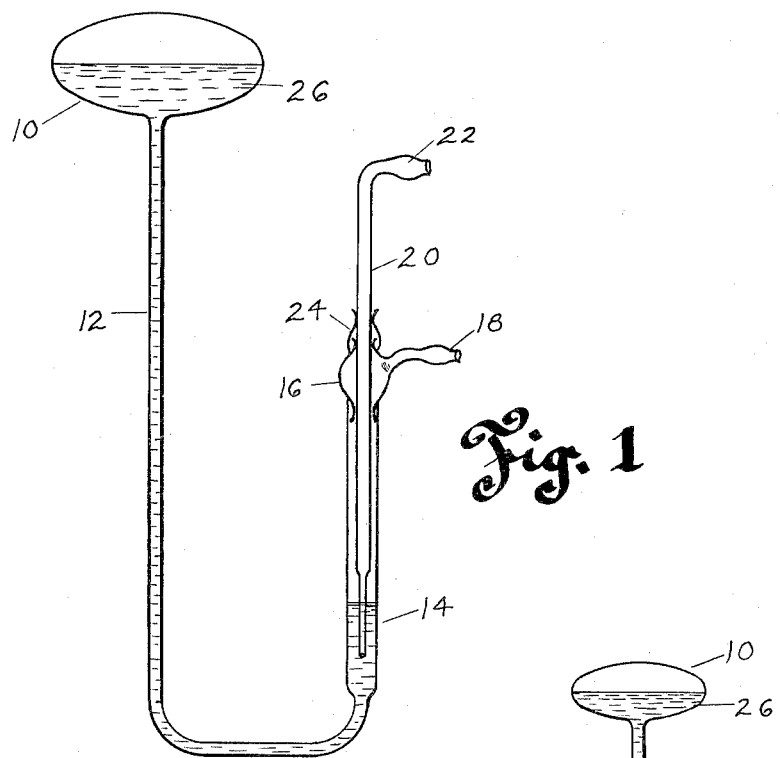
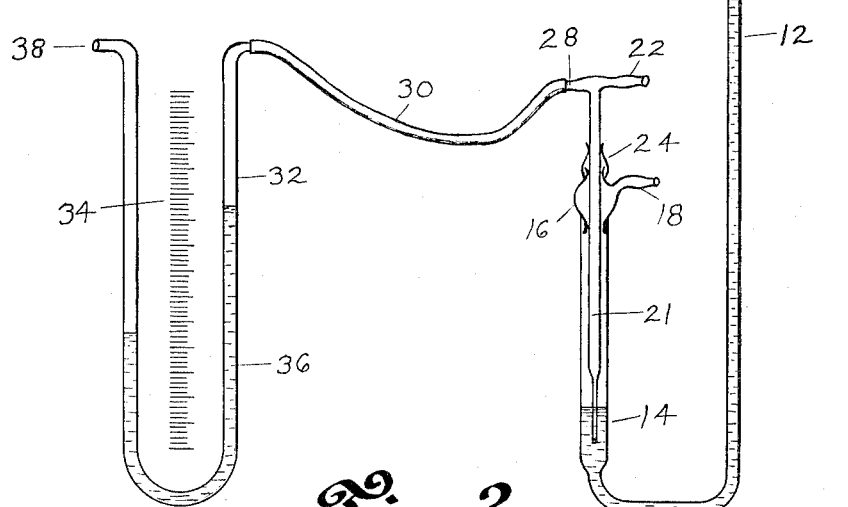

April 1, 1952      D. W. RAU      2,591,197
FLUID PRESSURE REGULATING APPARATUS

Filed Dec. 20, 1947      2 SHEETS—SHEET 2

WITNESS:

INVENTOR
David W. Rau

BY
Roy Eilers
ATTORNEY

Patented Apr. 1, 1952

2,591,197

UNITED STATES PATENT OFFICE 2,591,197

FLUID PRESSURE REGULATING APPARATUS

David W. Rau, Kirkwood, Mo., assignor to Vickers, Incorporated, a corporation of Michigan Application December 20, 1947, Serial No. 792,938

20 Claims. (Cl. 137—53)

This invention relates to improvements in regulating apparatus. More particularly this invention relates to improvements in regulating apparatus which can set and maintain a desired pressure on a given quantity of gas.

It is therefore an object of the present invention to provide an improved regulating device which can be used to set and maintain a desired pressure on a given quantity of gas.

In working with gases for various purposes, it would be desirable to be able to treat the gases as though they were always subjected to a predetermined and fixed ambient pressure. However, as is well known, the ambient or atmospheric pressure is not fixed; instead that pressure varies considerably from time to time. As a result, in the absence of regulating apparatus that can set and maintain a constant pressure for confined gas, a person doing work with gases based upon the volume of those gases will find it necessary to make frequent tests of the barometric pressure and then correct the observed volume measurements of the gas. These periodic measurements are time consuming, and they necessitate the making of various calculations and corrections; the need of making visual measurements, and of making calculations and corrections based upon those measurements, introducing considerable probability of human errors. For these reasons, work done with gases based upon the volume of those gases is slow and is likely to be in error. This is objectionable. The present invention obviates these objections by providing a regulating device which operates, despite variations in ambient pressure, to maintain a fixed and constant pressure on a given quantity of gas. It is therefore an object of the present invention to provide a regulating device which operates, despite variations in ambient pressure, to maintain a fixed and constant pressure on a given quantity of gas.

It is oftentimes desirable, when working with gases, to create a fixed pressure, greater than the ambient pressure, and to maintain that fixed pressure on those gases for considerable periods of time irrespective of variations in the ambient pressure. Where this is done, numerous calculations and visual observations, with their attendant human errors, can be obviated. The present invention makes it possible to set and maintain a fixed pressure, greater than the ambient pressure, by providing a liquid column that moves in response to variations in ambient pressure and by providing a bubbler tube that extends down into the liquid column. With this arrangement, the instantaneous total or absolute pressure on the gas in the bubbler tube will be the sum of the instantaneous ambient pressure and the instantaneous hydrostatic pressure on the liquid at the bottom of the bubbler tube. Moreover, the total instantaneous pressure can be made to remain unchanged despite variations in ambient pressure, since the regulating device can be dimensioned so a change in instantaneous ambient pressure is always accompanied by an equal but opposite change in hydrostatic pressure. Thus, while the instantaneous ambient and hydrostatic pressures may change frequently, the instantaneous total pressure in the bubbler tube will always remain the same. By placing gases in a container and by connecting that container to the bubbler tube, it is possible to maintain a pressure on the gases in that container which will remain unchanged despite variations in ambient pressure. It is therefore an object of the present invention to connect a container to a bubbler tube which extends down into a liquid column that moves in response to variations in ambient pressure.

In making selenium rectifiers it is frequently desirable to chemically modify the selenium. This practice is known as inoculating selenium; and in inoculating selenium it is oftentimes desirable to measure out a predetermined quantity of gas, and then to move that gas into contact with the selenium. To obtain a uniform amount of inoculation each time, the volume of the gaseous inoculant should be measured at the same pressure and temperature each time. By using the regulating device of the present invention it is possible to obtain the exact amount of inoculant each and every time, irrespective of variations in ambient pressure. It is therefore an object of the present invention to provide a regulating device which will draw in a predetermined quantity of gaseous inoculant, measure the volume of that inoculant at a fixed pressure, and then force the inoculant into contact with selenium.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

Figure 4:
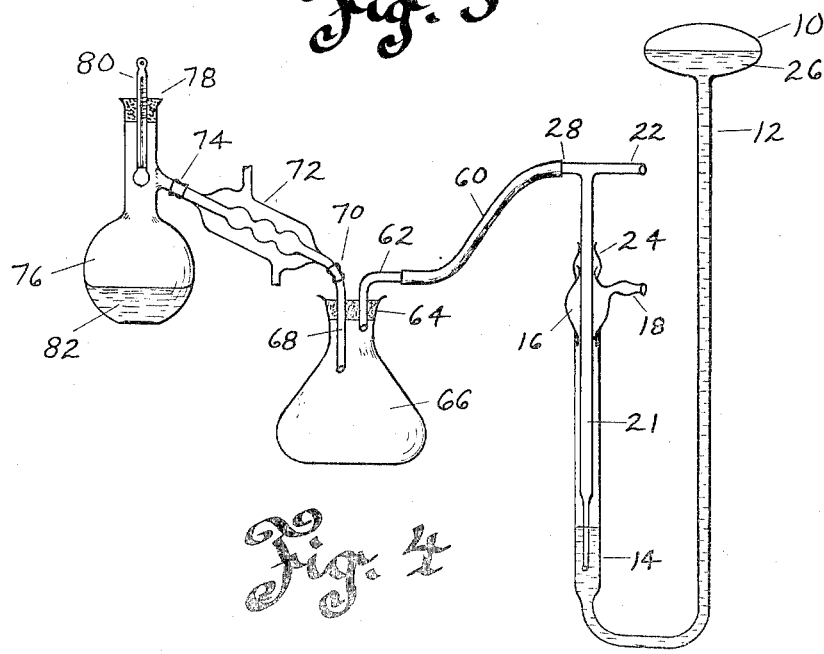

In the drawing, Fig. 1 is a side elevational view of a regulating device that is made in accordance with the principles and teachings of the present invention, Fig. 2 is a side elevational view of the regulating device of Fig. 1 as it is used with an open manometer, Fig. 3 is a side elevational view of the regulating device of Fig. 1 as it is used with a gas measuring device, and Fig. 4 is a side elevational view of the regulating device of Fig. 1 as it is used with distillation apparatus.

Referring to the drawing in detail, the numeral 10 denotes an enlarged bulb which has a closed top and closed sides but has an opening in the bottom thereof. A U-tube 12 has one of its ends sealed to the opening in the bottom of the bulb 10, and it has an enlarged reservoir 14 at its other end. The reservoir 14 is vertically disposed and the upper end thereof receives and supports a spray trap 16 in an air-tight seal. Where the regulating apparatus is made of glass, the spray trap 16 is preferably fused to the top of the reservoir 14. Where the regulating apparatus is made of metal or other materials, the spray trap 16 can be sealed to the reservoir 14 by means of gaskets, welding, or the like. The spray trap 16 has circular openings at the top and bottom thereof, and those openings are large enough to accommodate a bubbler or pressure relief tube 20. The diameter of the bubbler tube 20 is small enough to permit air or gas to pass through the space between the outer periphery of the tube 20 and the inner periphery of the opening at the bottom of the spray trap 16, but that diameter is large enough so the tube 20 can be guided and supported by the spray trap 16.

Air or gas passing upwardly along the sides of the bubbler tube 20 will pass through the bottom opening in the spray trap 16 and through the outlet 18 of spray trap 16 to the surrounding atmosphere. However, fluid that tends to form bubbles or spray and tends to move upwardly with that gas or air will, in most instances, be stopped by the lower end of spray trap 16. In the event, any fluid does manage to pass through the bottom opening of spray trap 16, that fluid will drift to one side of the trap and drain back down into reservoir 14. The upper end of the bubbler tube 20 extends upwardly beyond the upper end of spray trap 16 and it is provided with an inlet 22. This inlet may be connected to any suitable source of air or gas under pressure. Air or gas introduced into the inlet 22 will pass downwardly to the lower end of bubbler tube 20 and issue into the fluid 26 within the reservoir 14. The fluid 26 of reservoir 14 occupies the entire volume of the U-tube 12 and approximately one half of the enlarged bulb 10. The level of the fluid in bulb 10 is preferably set so it is at that portion of bulb 10 which has the largest internal area. The rest of bulb 10 is evacuated; and the difference between the vacuum in bulb 10 and the pressure of the atmosphere surrounding outlet 18 of spray trap 16 will determine the heights of the fluid 26 in bulb 10 and reservoir 14. A resilient sleeve 24 closely surrounds the bubbler tube 20 and the upper end of the spray trap 16; and this sleeve permits adjustment of the vertical position of bubbler tube 20 relative to spray trap 20 while sealing tube 20 to trap 16. With this arrangement, air or gas introduced into inlet 22 must pass through the fluid 26 which is above the lower end of bubbler tube 20 and must pass to the outlet 18 of spray trap 16.

The fluid 26 which is confined within the bulb 10, U-tube 12, and reservoir 14 is preferably a dense liquid such as mercury. That fluid can be introduced into the bulb 10, U-tube 12, and reservoir 14 in such a way that the bulb 10 and U-tube 12 are initially completely filled with fluid and are thus completely devoid of air and gas. Thereafter the bulb 10, U-tube 12 and reservoir 14 can be made to assume the position shown in Fig. 1, whereupon the fluid 26 will move downwardly in bulb 10 and U-tube 12 until the pressure of the atmosphere surrounding outlet 18 of spray trap 16 is sufficient to resist further downward movement of that fluid. The exact level of the fluid 26 in bulb 10 and reservoir 14 will never be fixed since it will vary whenever the pressure of the atmosphere surrounding outlet 18 of spray trap 16 varies. The principal variation in the level of fluid 26 will occur in reservoir 14, and only very minor variations will occur in the level of the fluid in bulb 10; since the diameter of bulb 10 is much larger than the diameter of reservoir 14. By making the diameter of the bulb 10 approximately ten (10) times as large as the diameter of reservoir 14, it is possible to have the level in reservoir 14 move one hundred (100) times the distance moved by the level in bulb 10. As a result, the fluid level in reservoir 14 is quite responsive to changes in ambient pressure.

The lower end of the bubbler tube 20 will extend down into the fluid 26 in the reservoir 14; the greater the distance, the greater the pressure that must be exerted on air or gas in bubbler tube 20 to force it to pass into the fluid 26. Any gas issuing from the lower end of bubbler tube 20 will be subject to two separate pressures; one being ambient pressure, and the other being hydrostatic pressure due to the fluid 26 above the lower end of bubbler tube 20. The two pressures combine to provide a total absolute pressure on the air or gas. The ambient pressure will change from time to time; and since the hydrostatic pressure is determined by the relative heights of the fluid 26 in bulb 10 and reservoir 14, and since those heights are determined by barometric pressure, the hydrostatic pressure also will change from time to time. However, it will be recognized that the ambient and hydrostatic pressures will vary inversely, because a high ambient pressure will force the fluid 26 down in reservoir 14, thus reducing the hydrostatic pressure. Conversely, a low ambient pressure permits the fluid 26 to rise in reservoir 14 and increase the hydrostatic pressure. With such an arrangement, the pressure-induced variations in hydrostatic pressure can just about balance the changes in ambient pressure so that the absolute pressure on the gas or air in bubbler tube 20 is constant. The larger the ratio of bulb diameter to reservoir diameter, the more completely the changes in hydrostatic pressure will balance the changes in ambient pressure.

Any suitable fluid can be used in the regulating device, but mercury is preferred because of its density. To attain an absolute pressure of two atmospheres, with mercury in the regulating device, it is only necessary to place the lower end of bubbler tube 20 about thirty (30) inches below the level of the fluid in reservoir 14. If water was used as the fluid, the lower end of bubbler tube 20 would have to be immersed in about thirty-three (33) feet of water to provide absolute pressure of two atmospheres. The figures of two atmospheres is not the upper limit of pressures attainable with this pressure regulating apparatus, since a multitude of pressures above and below that figure can be set and maintained by this regulating apparatus. The exact total pressure will be determined by the sum of the instantaneous ambient pressure and the instantaneous hydrostatic pressure. In setting the regulating device to maintain a given pressure, the instantaneous ambient pressure is ascertained and is subtracted from the desired total or absolute pressure to indicate the required instantaneous hydrostatic pressure; and the bubbler tube 20 is extended down into the fluid 26 to provide that instantaneous hydrostatic pressure. The resilient sleeve 24 permits adjustment of the position of the bubbler tube 20 relative to the reservoir 14 without any loss of pressure through leakage.

In Fig. 2 a pressure regulating device of the type shown in Fig. 1 is shown connected to a manometer of the U-tube type. The bubbler tube 21 of Fig. 2 is similar to the bubbler tube 20 of Fig. 1 except that it has a T-junction instead of an L at the top. That T-junction has an inlet 22 and an outlet 28, which is connected to the U-shaped manometer 32 by a flexible tube 30. The arms of the manometer contain a measuring fluid 36 of any desired density or quality; and a graduated scale 34 which is positioned between the arms of the manometer makes it easy to read the difference between the levels in the manometer. The left-hand arm of the manometer is connected to a confined volume of gas at an unknown pressure by outlet 38; and the manometer will balance the known pressure in bubbler tube 21 against the unknown pressure on the confined volume of gas. The difference between the levels of the liquid in the arms of the manometer 32 will give a measure of the difference in pressure between the gas or air in bubbler tube 21 and the gas volume with which outlet 38 communicates. It will be noted that the gas or air introduced into inlet 22 does not pass into and through the manometer 32. Instead, that gas or air passes directly down bubbler tube 21 and out through spray trap 16; the air, gas or vapor in manometer being "dead" or virtually static. This avoids loss of vapor from the fluid in the manometer.

Another use of the regulating device of the present invention is disclosed in Fig. 3, wherein the regulating device is connected to a gas measuring device. The outlet 28 of the bubbler tube 21 is connected to a leveling tube 46 by means of flexible tube 40, L-shaped arm 42 and stopper 44. The leveling tube 46 can be moved up and down as desired; and when so moved the fluid 47 in that tube will seek its own level in the leveling tube 46 and burette 54. The outlet of the leveling tube 46, which is denoted by the numeral 48 is connected to the inlet 52 of the burette 54 by a flexible tube 50.

In using this combination of devices, the leveling tube 46 is initially raised until the level of fluid in the burette 54 rises to the top of that burette and fills the T-junction 57. Thereafter, the valve 56 is closed, the valve 58 opened, and the leveling tube is lowered until the fluid level in burette 54 reaches the desired graduation; thus showing that the desired volume of gas has been drawn into the burette 54. The fluid levels in tube 46 and burette 54 will be identical; the flexible tube 50 which permitted this movement of the leveling tube 46, also permitting the fluid to seek its own level. At this time, the pressure on the gas in burette 54 will be precisely the same as the known pressure in bubbler tube 21. Having thus obtained a quantity of gas whose volume has been precisely determined at a known pressure, the operator opens valve 56 and raises the leveling tube 46 until the level of the liquid in the burette 54 rises to the valve 56 and expels the gas.

The valve 56 may be connected to a pot containing selenium, and thus the leveling tube 46 can force the inoculant in gaseous state into the pot to inoculate the selenium. By exerting the same pressure on the gas in the system each time an inoculation is made, it is possible to attain exceedingly precise determinations of the amount of inoculant going into the selenium. Thus it is possible to make the inoculations exactly the same in each and every instance, irrespective of changes in ambient pressure.

Another use of the pressure regulating device of the present invention is making precise distillations, distillation curves, and boiling point determinations, and that use is disclosed in Fig. 4. The outlet 28 of the bubbler tube 21 is connected to a flask for condensed material. That flask is denoted by the numeral 66 and it is connected to the outlet 28 of bubbler tube 21 by flexible tube 60, bent arm 62, and stopper 64. A drain tube 68 also extends through the stopper 64, and that tube is connected to a condenser 72 by means of a short flexible tube 70. The condenser 72 is connected to a side arm flask 76 by means of a short flexible tube 74. A stopper 78 is provided in the top of the side arm flask 76, and that stopper supports a thermometer 80. With this arrangement, the material to be distilled, which is denoted by the numeral 82, will be heated, will rise upwardly, and will then be directed downwardly through the side arm of the flask 76 until it passes through the condenser 72 and is converted to the liquid form so it can drain down into the flask 66. The pressure exerted on the material in the flask 66 will always be constant since the pressure in the bubbler tube 21 will be constant. This facilitates precise distillation operations, and eliminates all variations due to ambient pressure variations.

By use of the regulating apparatus provided by the present invention it is possible to operate under any given pressure above ambient pressure and to maintain that pressure constant irrespective of the variations in ambient pressure. It is impossible to attain absolutely complete correction for the changes in ambient pressure, but the error is very small and is actually insignificant. Where the diameter of the reservoir 14 is one-tenth ($^1/_{10}$) of the diameter of the bulb 10, the fluid level in bulb 10 will move only one-hundredth ($^1/_{100}$) as far as the fluid level will move in reservoir 14. Thus, there will be a compensation factor of ninety-nine percent (99%). An even greater compensation can be attained by further increasing the diameter of the bulb 10 relative to the diameter of reservoir 14. The principal limitation to such increases in area is the added cost of mercury. Actually a correction of ninety-nine percent (99%) is satisfactory for all reasonable purposes. To minimize the amount of mercury required, the bulb 10 can be made with a progressively flattened base so that the total volume of mercury involved is small compared to the area involved.

Whereas a preferred embodiment of the present invention has been shown and described in the drawing and accompanying description, it should be obvious to those skilled in the art that various changes may be made in the form of the invention without affecting the scope thereof.

What I claim is:

1. A device that is adapted to maintain gas under constant pressure irrespective of changes in ambient pressure and that comprises a container which has a closed end and an open end, a liquid column within said container intermediate the ends thereof, an evacuated atmosphere between one end of said liquid column and said closed end of said container, the other end of said liquid column being exposed to ambient pressure through said open end of said container whereby said liquid column moves down whenever ambient pressure increases and moves up whenever ambient pressure decreases, and a bubbler tube, said bubbler tube extending down into said other end of said liquid column a predetermined distance to provide a desired hydrostatic pressure, whereby gas passing through said bubbler tube will be under a pressure higher than the ambient pressure, said liquid column being movable in response to variations in ambient pressure to change the pressure required to pass gas through said bubbler tube and thus maintain the total instantaneous pressure in said bubbler tube constant.

2. A device that is adapted to maintain gas under constant pressure irrespective of changes in ambient pressure and that comprises a container which has a closed end and an open end, a liquid column within said container intermediate the ends thereof, an evacuated atmosphere between one end of said liquid column and said closed end of said container, the other end of said liquid column being exposed to ambient pressure through said open end of said container whereby said liquid column moves in response to variations in atmospheric pressure, and a pressure relief tube, said pressure relief tube extending down into said other end of said liquid column a predetermined distance to provide a desired hydrostatic pressure whereby gas passing through said pressure relief tube will be under a pressure higher than the ambient pressure.

3. A constant pressure device that comprises a container which has a closed end and an open end, a liquid column within said container intermediate the ends thereof, an evacuated atmosphere between one end of said liquid column and said closed end of said container, the other end of said liquid column being exposed to ambient pressure through said open end of said container whereby said liquid column moves in response to variations in ambient pressure, and a bubbler tube, said bubbler tube extending down into said other end of said liquid column a predetermined distance to provide a desired hydrostatic pressure.

4. A constant pressure device that comprises a container which has a closed end and an open end, a liquid column within said container intermediate the ends thereof, an evacuated atmosphere between one end of said liquid column and said closed end of said container, the other end of said liquid column being exposed to ambient pressure through said open end of said container whereby said liquid column moves down whenever atmospheric pressure increases and moves up whenever atmospheric pressure decreases, and a pressure relief tube, said pressure relief tube extending down into said other end of said liquid column.

5. A device that comprises a container which has a closed end and an open end, a liquid column within said container intermediate the ends thereof, an evacuated atmosphere between one end of said liquid column and said closed end of said container, the other end of said liquid column being exposed to ambient pressure through said open end of said container whereby said liquid column moves in response to variations in atmospheric pressure, and a pressure relief tube, said pressure relief tube extending down into said other end of said liquid column whereby gas passing through said pressure relief tube will be under a pressure higher than the ambient pressure.

6. A device that comprises an element which has an evacuated atmosphere therein and which has a portion thereof that is movable in response to variations in ambient pressure, and a pressure relief tube that is in juxtaposition to said pressure-responsive element and which has one end thereof closely adjacent said portion of said pressure-responsive element, said one end of said pressure relief tube being disposed so it normally discharges to the atmosphere, said element responding to variations in ambient pressure to move said portion thereof toward and away from said one end of said pressure relief tube and thereby vary the effective size of said one end of said pressure relief tube and thus maintain the pressure in said pressure relief tube constant.

7. A device that is adapted to maintain gas under constant pressure irrespective of changes in ambient pressure and that comprises an element which has an evacuated atmosphere therein and which has a portion thereof that is movable in response to variations in atmospheric pressure, and a pressure relief tube that is in juxtaposition to said pressure-responsive element and which has one end thereof closely adjacent said portion of said pressure-responsive element, said one end of said pressure relief tube being disposed so it normally discharges to the atmosphere, said element being movable in response to variations in atmospheric pressure to move said portion thereof toward and away from said one end of said pressure relief tube and thereby vary the effective size of said one end of said pressure relief tube and thus change the pressure required to pass gas through said pressure relief tube and thus maintain the total instantaneous pressure in said pressure relief tube constant, said pressure relief tube having a passageway for gas passing therethrough and having an arm that communicates with said pressure relief tube but is normally free of gas passing through said pressure relief tube, said arm containing virtually static gas under fixed pressure.

8. A constant pressure device that comprises a container which has a closed end and an open end, a barometric liquid column within said container intermediate the ends thereof, an evacuated atmosphere between one end of said liquid column and said closed end of said container, the other end of said liquid column being exposed to ambient pressure through said open end of said container whereby said liquid column is movable in response to variations in ambient pressure, and a pressure relief tube that extends into said other end of said liquid column and discharges gas which passes through said liquid column to the atmosphere, whereby gas in said pressure relief tube will be under a pressure higher than ambient pressure.

9. A device that is adapted to maintain gas under constant pressure irrespective of changes in ambient pressure and that comprises a container which has a closed end and an open end, a liquid column of a barometer within said container intermediate the ends thereof, and a bubbler tube, said tube having one arm extending down into said liquid column and serving as a passageway for gas passing into said liquid column, said tube having another arm which is connected to said first arm but is normally free of gas passing to said liquid column, said second arm containing virtually static gas under fixed pressure.

10. A device that comprises a container which has a closed end and an open end, a liquid column of a barometer within said container intermediate the ends thereof, and a bubbler tube, said tube extending down into said liquid column, said liquid column being movable in response to variations in ambient pressure to change the pressure required to pass gas through said tube and thus maintain the total instantaneous pressure in said tube constant.

11. The method of maintaining a fixed pressure irrespective of changes in ambient pressure that comprises forcing gas down under the surface of a liquid column which moves upwardly and downwardly in response to ambient pressure.

12. The method of maintaining a fixed pressure irrespective of changes in ambient pressure that comprises forcing gas down under the surface of a liquid column which moves upwardly and downwardly in response to ambient pressure, said column operating to move upwardly and increase the hydrostatic pressure when the ambient pressure decreases, thus keeping the instantaneous total pressure constant.

13. The method of maintaining a fixed pressure irrespective of changes in ambient pressure that comprises forcing gas down under the surfaces of a liquid column which moves upwardly and downwardly in response to ambient pressure, said liquid column moving upwardly with decreases in ambient pressure and moving downwardly with increases in ambient pressure.

14. The method of maintaining a constant pressure irrespective of changes in ambient pressure which comprises utilizing ambient pressure to vary the resistance to the passage of gas from a tube.

15. A device that comprises a column sealed at one end thereof, a reservoir connected to the other end of said column and open to the atmosphere, a liquid supported in said column and said reservoir by the difference between the ambient pressure and an evacuated atmosphere in said column above said liquid, and a bubbler tube that extends down into the liquid in said reservoir.

16. A device that comprises a sealed column, a reservoir connected to said sealed column, a fluid supported in said column and said reservoir by the difference between the ambient pressure and an evacuated atmosphere in said sealed column above said fluid, and a bubbler tube that extends down into said reservoir, and a seal between said bubbler tube and said reservoir that permits adjustment of the depth to which said bubbler tube is moved.

17. A device that comprises a column sealed at one end thereof, a reservoir connected to the other end of said sealed column and open to the atmosphere, a liquid supported in said column and said reservoir by the difference between the ambient pressure and an evacuated atmosphere in said column above said liquid, and a bubbler tube that extends down into the liquid in said reservoir, the diameter of said reservoir being smaller than the diameter of a portion of said column.

18. A device that comprises a column sealed at one end thereof, a reservoir connected to the other end of said sealed column and open to the atmosphere, a liquid supported in said column and said reservoir by the difference between the ambient pressure and an evacuated atmosphere in said column above said liquid, and a bubbler tube that extends down into the liquid in said reservoir, the diameter of said reservoir being smaller than the diameter of a portion of said column, whereby the exposed area of the liquid in the reservoir is less than the exposed area of the liquid in the column.

19. A device that comprises a column sealed at one end thereof, a reservoir connected to the other end of said sealed column and open to the atmosphere, a liquid supported in said column and said reservoir by the difference between the ambient pressure and an evacuated atmosphere in said column above said liquid, and a bubbler tube that extends down into the liquid in said reservoir, said column having an enlarged diameter portion at the level of the liquid therein, said enlarged diameter portion being at least ten times the diameter of said reservoir.

20. A device that comprises a column sealed at one end thereof, a reservoir connected to the other end of said sealed column and open to the atmosphere, a liquid supported in said column and said reservoir by the difference between the ambient pressure and an evacuated atmosphere in said column above said liquid, and a bubbler tube that extends down into the liquid in said reservoir, the diameter of said reservoir being smaller than the diameter of a portion of said column, whereby changes in ambient pressure cause greater linear movement of the fluid in the reservoir than in the column.

DAVID W. RAU.

REFERENCES CITED

The following references are of record in the file of this patent:

UNITED STATES PATENTS

| Number | Name | Date |
| --- | --- | --- |
| 766,820 | Fulton | Aug. 9, 1904 |
| 1,016,372 | Smith | Feb. 6, 1912 |
| 1,107,887 | Bowser | Aug. 18, 1914 |
| 1,205,434 | Connell | Nov. 21, 1916 |
| 1,371,866 | Crompton | Mar. 15, 1921 |
| 1,858,202 | Watkins | May 10, 1932 |